United States Patent [19]

Gregory et al.

[11] Patent Number: 5,125,480
[45] Date of Patent: Jun. 30, 1992

[54] LUBRICATING SYSTEM

[75] Inventors: Kenneth L. Gregory, Houston; Charles W. Ehlert, Katy; G. Everett Sloat, Brookshire, all of Tex.

[73] Assignee: Lubrication Systems Company of Texas, Inc., Houston, Tex.

[21] Appl. No.: 624,995

[22] Filed: Dec. 10, 1990

[51] Int. Cl.[5] ............................................. F01M 1/18
[52] U.S. Cl. .................................. 184/6.26; 184/6.1; 184/6.4; 73/10; 364/551.01; 364/556
[58] Field of Search ...................... 184/6.26, 6.4, 6.1, 184/104; 73/10, 64; 340/450.3, 825.06; 364/556, 551.01

[56] References Cited

U.S. PATENT DOCUMENTS

| | | | |
|---|---|---|---|
| 3,952,566 | 4/1976 | Jacobson | 73/10 |
| 4,064,455 | 12/1977 | Hopkin et al. | 73/10 |
| 4,312,424 | 1/1982 | Taylor et al. | 184/6.4 |
| 4,445,168 | 4/1984 | Petryszyn | 184/6.1 |
| 4,527,661 | 7/1985 | Johnstone et al. | 184/6.1 |
| 4,735,286 | 4/1988 | Miki et al. | 184/6.4 |

*Primary Examiner*—Ira S. Lazarus
*Assistant Examiner*—Alan B. Cariaso
*Attorney, Agent, or Firm*—Bill B. Berryhill

[57] ABSTRACT

An improved lubricating system for lubrication of equipment bearings comprising: an air supply subsystem, an oil supply subsystem and an oil mist generation subsystem. The oil mist generation subsystem is connected to the air supply and oil supply subsystems for combining air and oil therefrom into an oil mist for distribution to the equipment bearings. A computerized controller is connected to the air supply, oil supply and oil mist genrating subsystem for controlling and monitoring the operating conditions of the system.

29 Claims, 4 Drawing Sheets

LUBRICATING SYSTEM

BACKGROUND OF THE INVENTION

1. Field of the Invention

The present invention pertains to lubrication systems for lubricating the bearings of rotating equipment. More specifically, the present invention is directed to an oil mist lubricating system in which major operating variables of the system are controlled by a microprocessor.

2. Description of the Prior Art

Oil mist lubrication is used in many industries to provide continuous, effective lubrication to anti-friction bearings in rotating equipment such as centrifugal pumps, electric motors, steam turbines, gear boxes, blowers and fans. An oil mist lubrication system typically comprises a generator in which a compressed air stream in turbulent flow is combined with a liquid lubricant to create a fine mist of oil particles suspended in an air stream. These oil particles are typically one to five microns in diameter. The oil mist is transported through a piping system and delivered into the bearing housings of one or more pieces of rotating equipment. The oil mist continuously bathes the bearings of the equipment and maintains a slight positive pressure in the bearing housing to reduce contamination from outside sources. If the lubricating system functions properly, bearing life is extended, equipment down time and maintenance costs are reduced.

Optimum operation of an oil mist system requires that equipment bearings receive a reliable, continuous supply of lubricant while minimizing two important variables: the amount of oil consumed and the amount of spray mist escaping to the outside environment. When oil mist is generated, the oil is atomized into very fine particles and can be conveyed long distances in a properly designed header system with minimum wetting out on the walls of the pipe in which it is being conveyed. These fine particles, referred to as "dry mist", must be converted into larger particles, known at "wet mist", in order to wet out on the metal surfaces of the equipment bearings being lubricated. This is accomplished by passing the mist through a specially designed restriction orifice known as a reclassifier. The reclassifier induces turbulence in the stream to convert small particles into larger ones before the mist enters the equipment bearing housing. These reclassifiers serve the additional purpose of metering the amount of lubricant to each bearing to avoid over or under lubricating. Selection of the correct reclassifier for each application point in the system is based upon an understanding of the exact bearing configuration for each piece of equipment to be lubricated. Some of the oil mist particles, particularly the smallest ones, do not wet out on the metal surfaces of the equipment being lubricated. Instead, they pass through the bearing housings and are vented to the atmosphere. Thus, supplying sufficient oil without over consumption and minimizing stray mist contamination of the environment are problems not sufficiently addressed by the prior art.

Most integrated lubricating systems include an inlet air supply, an input oil supply, a mist generating head and controls for adjusting and monitoring the operation of the system and the operating variables thereof. Oil mist systems of the prior art, in recent years, have utilized analog controls. Such systems are designed to provide an alarm when one of the operating variables moves outside of an operating range set when the system is constructed. These ranges may be quite wide. For example, oil temperature in the mist unit reservoir is typically set at a minimum of 80 degrees F. and a maximum of 140 degrees F. This provides the minimum level of control to assure that the equipment is being adequately lubricated but it provides no opportunity to optimize the system operation. Another shortcoming of prior art oil mist systems is that an alarm condition in one variable might be accompanied by one or more alarms for other variables. For example, an alarm condition on a low mist pressure will often be accompanied by an alarm for low air temperature because the control system is designed to shut off the air heater when air flow decreases. An operator looking at a control panel when two or more alarm conditions are identified would not immediately know which condition was at fault and which ones were secondary alarms. While lubricating systems of recent years are much improved, a number of shortcomings still exist, leaving room for improvement.

SUMMARY OF THE PRESENT INVENTION

The improved lubricating system of the present invention includes an air supply, the inlet of which is connected to a source of pressurized air; an oil supply; an oil mist generator connected to the air supply and the oil supply and by which air and oil therefrom are combined in an oil mist for distribution; and microprocessor control means connected to the air supply, the oil supply and the oil mist generator for controlling and monitoring the operating conditions of the system. The microprocessor-based control incorporated into the present invention provides several features that improve the reliability of the oil mist supply, allow faster and more accurate problem identification and provide tighter control over operating variables. These characteristics eliminate many of the problems of the prior art.

The operating conditions of the present system are continuously monitored by air and oil pressure transducers, air and oil temperature sensors and a continuous oil level switch mounted on the oil reservoir. Analog signals from these sensing devices are converted to digital signals and inputted into the computerized control means. The control means not only alarms for any condition outside of the specified operating range but it allows the user to obtain exact operating conditions for each variable by simply pressing a key on the computer keypad and reading an alpha-numeric display screen. It also allows the user to program different limits to the acceptable operating range for any variable provided the limits are closer together than the ones established at the factory. It provides security against unauthorized personnel adjusting operating limits in order to get rid of an alarm condition by requiring the entry of a password before any changes can be made to previously established operating limits for any variable.

Additional features provided in the invention allow for remote monitoring of operating conditions and alarm signals. In addition, the lubrication system of the present invention is equipped with a first fault indicator i.e. when a fault occurs, the fault condition is automatically identified on an alpha-numeric display screen. Even if subsequent faults occur, the first fault indicator remains on the screen.

Other features of the lubrication system of the present invention for minimizing oil consumption and spray mist are an oil consumption meter which measures incoming oil and a mist density meter which measures oil mist density. The combination of these features allows the user to set up a systematic procedure for optimizing oil system operation by adjusting mist density. The oil consumption meter can be used to confirm the amount of oil being consumed and mist density can be monitored within a range set by the user to assure that accurate control is maintained at the optimum operating conditions.

Thus, the improved lubricating system of the present invention provides for continuous lubrication of the bearings of rotating equipment with greatly improved monitoring and control characteristics. With the computerized control of the present invention, operating variables of the system can be maintained within much more precise limits than with the prior art. Oil consumption and oil mist density are accurately controlled, reducing oil consumption and environmental pollution. Any faults in the system are quickly and accurately detected, a unique first fault capability identifying primary sources of alarm. The lubricating system of the present invention is superior to those of the prior art. Many other objects and advantages of the invention will be apparent from reading the description which follows, in conjunction with the accompanying drawings.

DESCRIPTION OF A PREFERRED EMBODIMENT OF THE INVENTION

Figure 1:
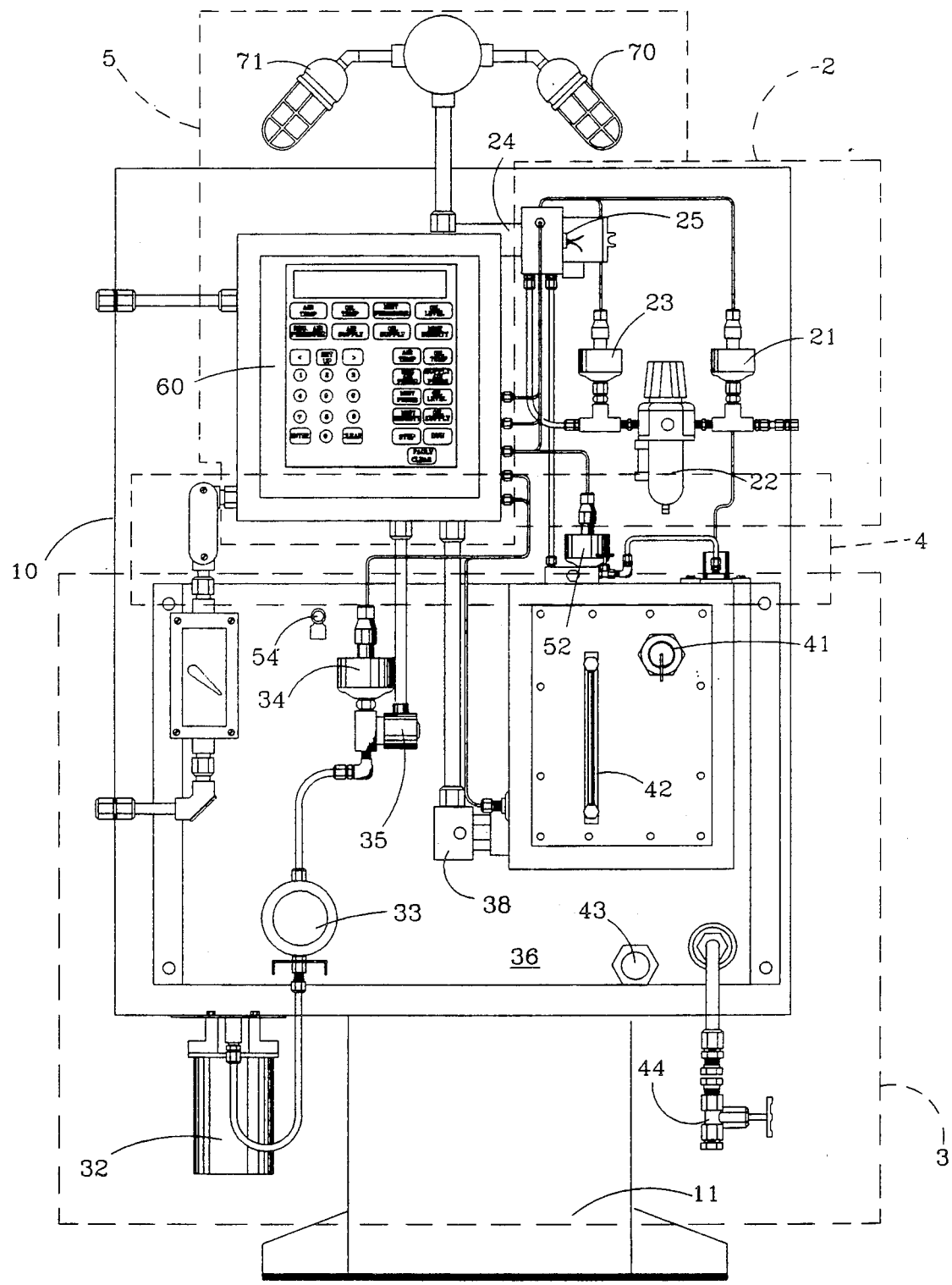
FIG. 1 is an elevation view of a lubricating system console, housing the components of an improved lubricating system, according to a preferred embodiment of the present invention.

Referring first to FIG. 1, there is shown, housed is a console housing 10 on a pedestal 11, components of an improved lubricating system for continuous lubrication of the bearings of rotating equipment (not shown). The lubricating system comprises four subsystems: inlet air supply and associated controls sensors and components generally designated in the area 2; input oil supply and reservoir, sensors and components generally designated in the area 3; mist generating head and monitoring components generally designated in area 4; and computerized control and monitoring components (controller), a portion of which is generally designated at 5. Each subsystem of the system plays an important role in providing a reliable and efficient oil mist lubricating system. The air supplies the driving force to generate oil mist and carries it to the bearings to be lubricated. The lubricant is provided through the oil supply and reservoir. The mist generating head combines the air and oil into oil mist to provide an efficient, centralized source of lubrication. The air, oil and mist generating components are integrated together with a micro-computer based controller to provide accurate and reliable control of and monitoring of the operating variables of the system.

Figure 2:
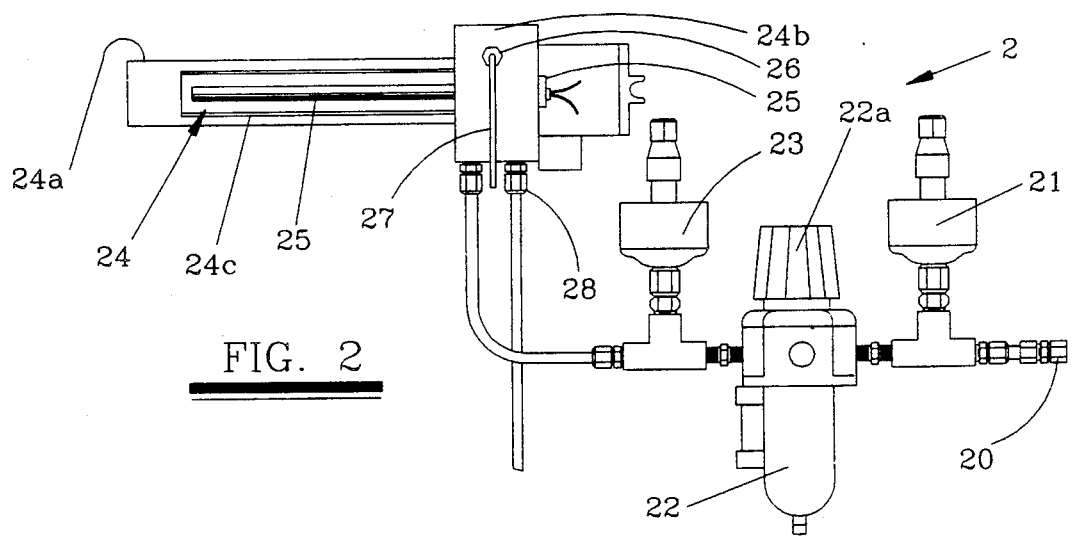
FIG. 2 is an expanded detail of the inlet air supply components of the lubricating system of FIG. 1.

Referring now to FIG. 2, there is shown the air supply subsystem 2 which continuously filters, regulates, heats and monitors air supplied to the system through an air supply inlet 20. The supply pressure is monitored by a supply air pressure transducer 21 which also provides an early warning if the air supply is inadequate, restricted or failing. The air passes through an integral air filter/air pressure regulator 22 which filters and controls air flow to a mist generating head as will be more fully understood hereafter. The air filter/air pressure regulator 22 is equipped with an automatic water drain valve which is connected to the outside of the housing 10 in which it is enclosed. An adjustment knob 22a on top of the filter/regulator 22 may be used to increase or decrease air supply. As air flow adjustments are made with the filter/regulator 22, the resulting changes are monitored by regulated air pressure transducer 23. This sensor monitors air supply required to maintain proper mist header pressure. It is interlocked with a mist pressure transducer in the oil mist generation subsystem 4 to assure that alarms produced as a result of breaks or restriction in the oil mist header cannot be cleared by adjusting incoming air pressure.

Downstream of the regulated air pressure transducer 23, the air enters an air heater manifold 24 which houses an air heater element 25, air temperature sensor 26 and high air temperature cutoff switch 27. The air heater manifold 24 is constructed using an outer tube 24a, one end is closed and the other end of which is connected to a mounting block 24b. Coaxially mounted inside of the outer tube 24a is a smaller diameter inner tube 24c. One end of the inner tube 24c is connected to the mounting block 24b. The other end is open. The air heater element 25 which provides the heat source for heating the air is inserted through the mounting block 24b and axially through the inner tube 24c. Air enters the space between the outer and inner tubes 24a, 24c and traverses to the closed end of the outer tube 24a. The air flow is then channeled through the space between the inner tube 24c and the heater element 25 toward the mounting block 24b where it is diverted past a control element before exiting on its way to an oil mist generator described hereafter.

When the heater element 25 is energized the air temperature increases as air passes through the space between the inner tube 24c and the air heater element 25. Radiant heat transferred from the heater element 25 to the inner tube 24c causes the inner tube 24c to heat up. As cool air enters the space between the outer tube 24a and the inner tube 24c, the incoming air supply is preheated, improving heater efficiency and energy conservation. This coaxial tube construction also eliminates potential burns from contact with the manifold 25.

The air temperature sensor 26 controls the air heater elements (on-off) through the control system and provides the operating signal used for air temperature readout and air temperature alarms. The high temperature alarm is interlocked with the air heater 25. If the air temperature sensor 26 detects a high temperature condition, an air temperature alarm is activated and the air heater 25 is turned off until the air temperature decreases to a normal temperature setting. After the air is filtered, regulated and heated (if required), it exits through an air outlet 28 to the mist head of the oil mist generation subsystem more fully described with reference to FIG. 4.

Figure 3:
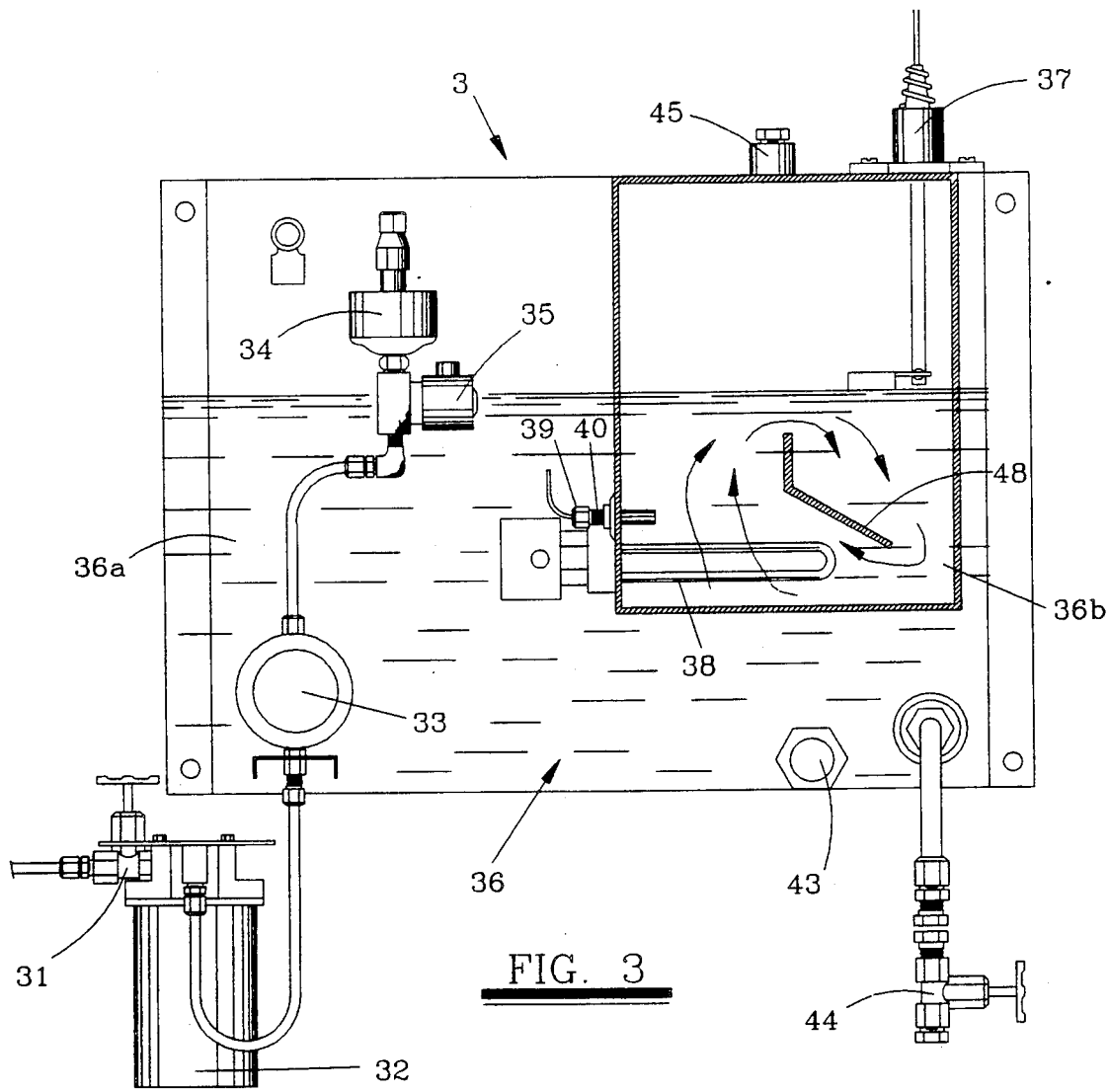
FIG. 3 is an expanded detail of the inlet oil supply components of the lubricating system of FIG. 1.

Referring now to FIG. 3, the oil supply subsystem, generally designated at 3 in FIG. 1, will be more fully described. Oil is pumped from an oil supply (not shown) through a valve 31 and an oil filter 32, e.g., a spin-on ten micron filter, which filters the oil as it flows into an oil reservoir 36. The valve 21 provided on the inlet side of the filter 32 may be closed to facilitate maintenance of the oil filter 32.

As oil moves from the oil filter 32 to the reservoir 36, it passes through an electronic oil consumption meter 33, which accurately monitors oil consumption. The oil consumption meter 33, not previously available in oil mist systems, is a unique component which helps monitor and minimize oil consumption and stray mist. The meter 33 measures incoming oil volume each time the reservoir 36 refills. This provides information on oil consumption and can be used to compute the oil/air ratio of the oil mist stream. In the prior art, oil consumption had to be approximated by recording the time required to go from full to empty in a reservoir and estimating the volume consumed. This of course was less accurate and required at least one day of operation to obtain material balance information.

Oil flow into the reservoir 36 is controlled by an oil supply solenoid 35. As oil is consumed, a continuous oil level switch 37 provides a control signal to open the solenoid valve 35, allowing the reservoir 36 to fill with oil. When oil fills to a preset level, the oil solenoid 35 is deenergized. An oil supply pressure transducer 34 monitors oil supply pressure to detect loss of pressure or over pressurization of the oil supply.

The oil reservoir 36 is divided into two side-by-side compartments, a larger compartment 36a and smaller compartment 36b. Oil is first pumped into the larger compartment 36a which holds a reserve of oil. The bottom of the smaller or misting compartment 36b is elevated above the bottom of the larger compartment 36a and in fluid communication therewith. Thus, the oil level in both remains substantially constant. There is a removable baffle 48 in the small compartment 36b. Any water or foreign material that might be pumped pass the filter 32 and into the reservoir can be detected through the reservoir bulls-eye sight glass 43 and drained through a drain valve 44. The two reservoir compartments 36a and 36b are internally ballasted so that the same oil level is maintained in both compartments and can be seen on the oil level gauge 42 (see FIG. 1). Oil level in the reservoir 36 is monitored by the continuous level switch 37 which provides a signal to a computerized controller for oil level readout and alarms in addition to the control signal for the oil solenoid valve 35. Internal interlocks are provided in the control system to block power to the oil solenoid 35 when a high oil level condition exists or to the oil heater 38 when a low oil level condition exists.

The smaller mist generating compartment 36b houses the oil heater 38, an oil temperature sensor 40 and high oil temperature cutout switch 39. As oil is heated and rises, it moves up to a baffle 48 and flows, due to convection, upwardly along the underside of the sloped baffle 48. As the warm oil rises it is displaced with cooler oil from above the baffle at the lowest end of the baffle. Due to the thermal rise from convection, circulation of oil in the reservoir 36 is established. (See arrows). The oil heater controller 40 is located on the end of the reservoir adjacent to the high end of the baffle 48, allowing the heated oil to flow past the controller as it rises, providing even heating and temperature control.

Because the misting compartment 36b is small and separate from the compartment 36a storing the bulk of the oil, an efficient temperature control is established for the volume on hand and available for oil mist generation. Because make-up oil is pumped into the larger compartment 36a, the effect of adding cool oil to the reservoir is minimized.

The oil temperature sensor 40 controls the oil heater 38 through controls in the system and provides the signal used for oil temperature readout in high and low oil temperature alarms. The high temperature alarm is interlocked with the oil heater control so that if oil temperature sensor 40 detects a high temperature condition, an oil temperature alarm is activated and the oil heater 38 is turned off until the oil temperature decreases to a normal temperature setting. The oil reservoir 36 is also equipped with a pressure relief valve 41 (see FIG. 1), the drain valve 44 and a manual pour oil fill port 45.

Figure 4:
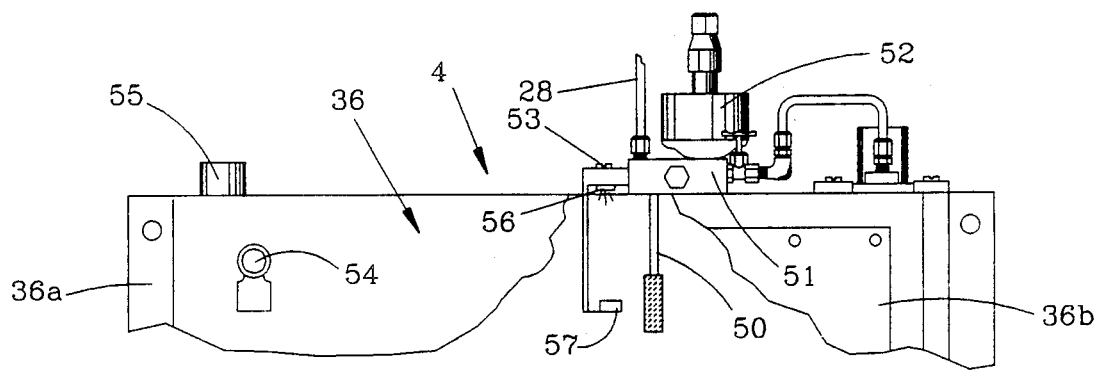
FIG. 4 is an expanded detail of oil mist generation components of the lubricating system of Fig. 1.

Reference is now made to FIG. 4 where components of the oil mist generation subsystem generally designated at 4 in FIG. 1, are shown in more detail. These components are mounted on top of the oil reservoir 36 and include an oil suction tube 50 which is emersed in heated oil in the smaller oil mist compartment 36b (see FIG. 3). As heated air from air supply outlet 28 (see FIG. 2) enters a vortex mist head 51, warm oil is drawn up through the oil suction tube 50. The oil is dispersed into the air as fine oil mist droplets which move through the air space above the oil level in the reservoir 36 and is discharged at 55 into an oil mist header (not shown) for distribution to points of application. The oil mist header pressure transducer 52 monitors oil mist header pressure from its location on top of the reservoir 36. A manual push button type oil mist inspection valve 54 is used for visual inspection of the oil mist output.

An oil mist density sensor 53 may be utilized if desired. The improved mist density sensor 53 of the present invention is an integral part of the oil mist unit. The device uses a stationary photo-optic bench, consisting of a light source 56 and a photocell 57, both located in the oil mist reservoir 36b. The oil mist passes between the light source 56 and the photocell 57. As the oil mist density (oil to air ratio) changes, the amount of light detected by the photocell changes. As the oil to air ratio increases, the opacity of the oil mist passing through the optical bench increases; as the oil to air ratio decreases, the opacity of the oil mist decreases. The oil mist sensor monitors relative changes in the opacity of the oil mist sample over time.

The light source 56 provides a constant level of illumination by being provided a continuous voltage from a regulated power supply located in the controller. As the oil mist changes in density, the level of light reaching the photocell 57 changes due to changing light refraction. The resultant photocell signal is compared to a separate constant non-variable signal. This comparison is made by an operational amplifier located on the mother board of the controller (see FIG. 6) which provides an output voltage dependent upon the difference between the current values and values represented by the constant signal. The resultant voltage signal is converted into an output value which can be displayed on the controller's alpha-numerical display 61 (see FIG. 5).

Mist density meters of the prior art also employ a photo-optic bench in order to monitor relative changes in opacity of an oil mist sample. The particular design most commonly used has two photo-optic benches that provide signals that are compared by an operational amplifier. One light source passes through clean air inside the controller on the way to being received by the photocell. The other light source, located in the exit pipe from the oil mist unit, passes through the oil mist stream where refraction occurs on its way to the photocell.

One deficiency of mist density meters of the prior art is that they are not an integral part of the oil mist unit, as is the improved mist density sensor of the present invention, and require a separate controller that must be externally mounted on the oil mist unit. Another major deficiency of the prior art is that the mist density value obtained from the controller varies widely with changes in temperature. The temperature conditions experienced by the two photo-optic benches can be different from each other because they are located at different places in the oil mist unit and are affected differently by changing ambient temperatures. This variability in measured oil mist value with daily and seasonal changes in ambient temperature makes the values quite unreliable as a tool for controlling and optimizing the operation of the unit.

The mist density sensor 53 overcomes this deficiency by minimizing the effects of temperature. Only one photocell 57 is used and it is located in the oil reservoir 36. This photocell is located in close proximity to the mist generation head 51, which uses temperature controlled heated air and oil to generate the oil mist, and thereby yields a thermally stable environment in which the photocell 57 operates. The value displayed on the alpha-numeric display is based on comparing the output from this thermally stable photocell to an independent, constant, regulated voltage which is not affected by temperature. Moreover, the same integral controller is sued to monitor and display mist density as is used for all other operating variables, thereby eliminating the need for a separate controller.

Figure 6:
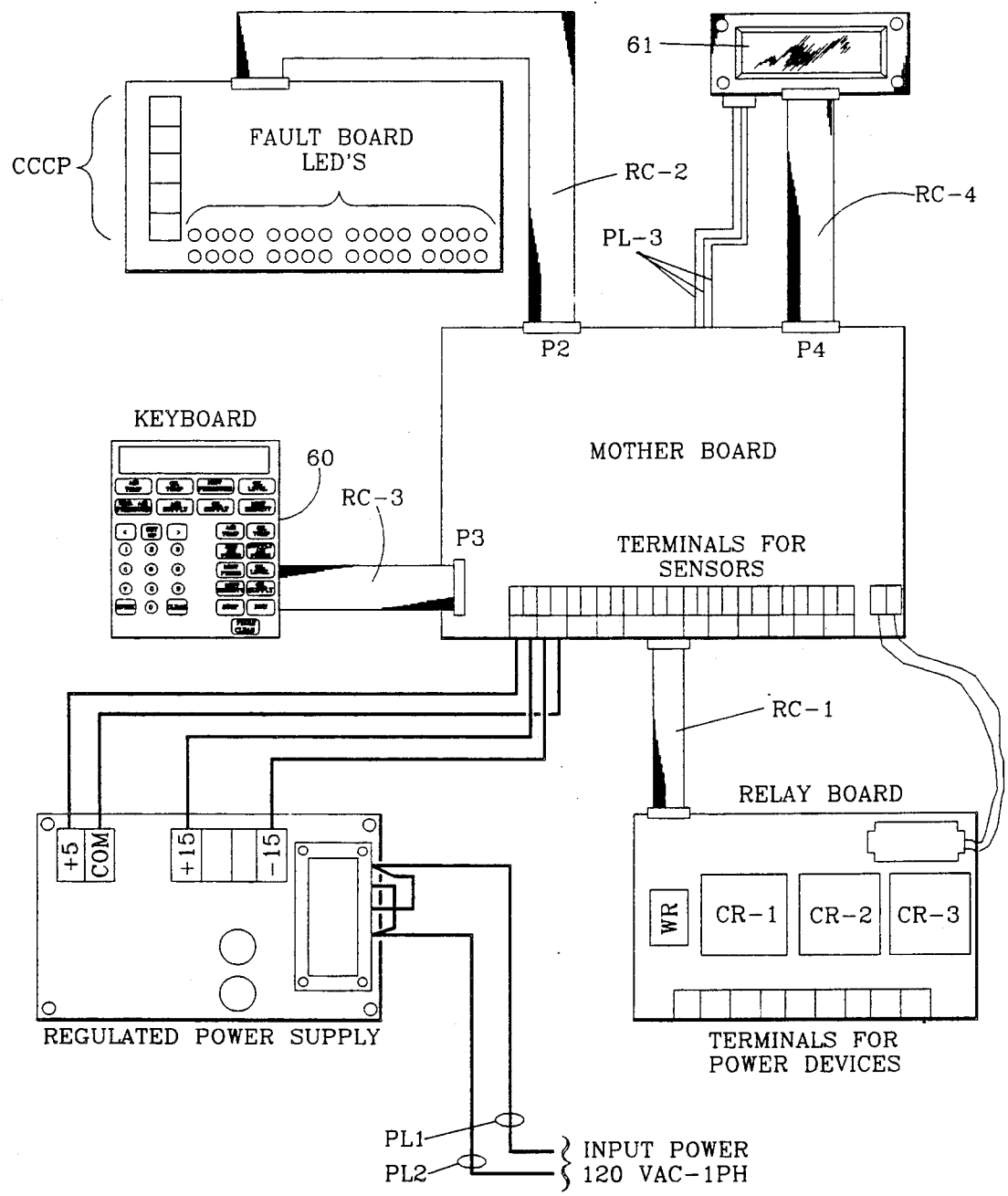
FIG. 6 is a circuit diagram of some of the electrical components of the computerized controls of the present invention.

The air supply, oil supply and oil mist generation subsystems are connected to the controller 5 whose components are illustrated in FIG. 6. As illustrated in FIG. 6, the controller 5 has a regulated power supply which converts 120 VAC power to 5V and 15V for supplying a mother board. The mother board circuitry includes a microprocessor and its associated analog to digital converter and internal registers. The mother board is connected by terminals to the various temperature, pressure, density and level sensors. It is also connected by ribbon cable RC-1 to a relay board which has relays CR-1, CR-2 and CR-3 for controlling the power devices connected through terminals therefor. These power devices are oil solenoid 35, oil heater 38 and air heater 25 (See FIGS. 2 and 3). A warning relay WR is also provided for controlling warning devices such as red and green light alarms 70 and 71 (see FIG. 1). The mother board is connected through ribbon cable RC-2 to a fault board on which are mounted LED's which indicate the status of each of the eight system operating variables. The keyboard 60 is also connected to the mother board by ribbon cable RC-3.

Also provided on the fault board is a computer compatible communication port CCCP which can be used to provide status information at a remote point, such as the user's control room. This port CCCP provides read only access to current unit operating conditions and set points on all variables and identified alarm conditions. Programming of the controller cannot be done from a remote location but must be accomplished by using the keypad 60 after providing the correct password.

Connected by ribbon cable RC-4 to the mother board is an alpha-numberic display screen 61 which will be viewed through the keyboard 60. Power is supplied from the mother board to the display through power lines PL-3.

As previously described, the system is equipped with sensors that monitor up to eight operating functions or variables.

1. Air temperature.
2. Oil temperature.
3. Supply air pressure.
4. Regulated air pressure.
5. Mist pressure.
6. Oil level in the reservoir.
7. Oil supply pressure.
8. Oil mist density.

A signal from each sensor is fed into conditioning circuits of the controller 5. The controller 5 is a solid state system shown in FIG. 6 consisting of a microprocessor, proprietary circuitry and a software program that provides a variety of information and alarms to the user. The conditioning circuit signals are sent to an analog-to-digital converter where voltage readings are converted into binary code and this code is stored in internal registers. The microprocessor then converts these raw binary values to scaled binary values based on a predetermined scale stored in the system's operating program. The program next compares the scaled values to the minimum, maximum and control settings for each operating variable in a predetermined sequence and takes the actions described hereafter.

The eight operating variables can be divided into two categories. For five of these variables (supply air pressure, regulated air pressure, mist pressure, oil supply pressure and mist density) the controller's software program compares the values for the current operating conditions with minimum and maximum settings for each operating variable (known as the high and low larm set points). If the monitored value for any variable falls outside the prescribed operating range, the controller recognizes a fault condition and provides three different types of alarms that will be described later. For the other three variables (air temperature, oil temperature and oil level in the reservoir) the controller compares the current value with the high and low alarm set point plus a third value known as the control set point. When the current value of air (or oil) temperature reaches the control set point, power to the air (or oil) heating element is turned on or off to control the temperature within a narrow band around the control set point. When the current value for oil level reaches the control set point, the oil solenoid valve is either opened or closed to initiate or stop oil flow into the reservoir to keep oil level within a prescribed band around its set point. The high and low alarm set points for these three variables function the same as previously described for the other five variables to give the user alarms whenever the values move outside of the acceptable operating range. The following table provides some typical high and low alarm set points and control set points that would be established when the oil mist system is assembled.

| Operating Conditions | Control Set Point | High Alarm Set Point | Low Alarm Set Point |
| --- | --- | --- | --- |
| Air Temperature (degrees F.) | 140 | 180 | 100 |
| Oil Temperature (degrees F.) | 110 | 140 | 89 |
| Oil Level (%) | 65 | 100 | 30 |
| Supply Oil Pressure (PSI) | — | 180 | 10 |
| Supply Air Pressure (PSI) | — | 150 | 25 |
| Regulated Air Pressure (PSI) | — | 65 | 10 |
| Mist Header Pressure (in. H2O) | — | 30 | 10 |
| Mist Density (%) | — | 95 | 5 |

These points can be changed by the user to values that better suit particular needs by a procedure that will be described.

Figure 5:
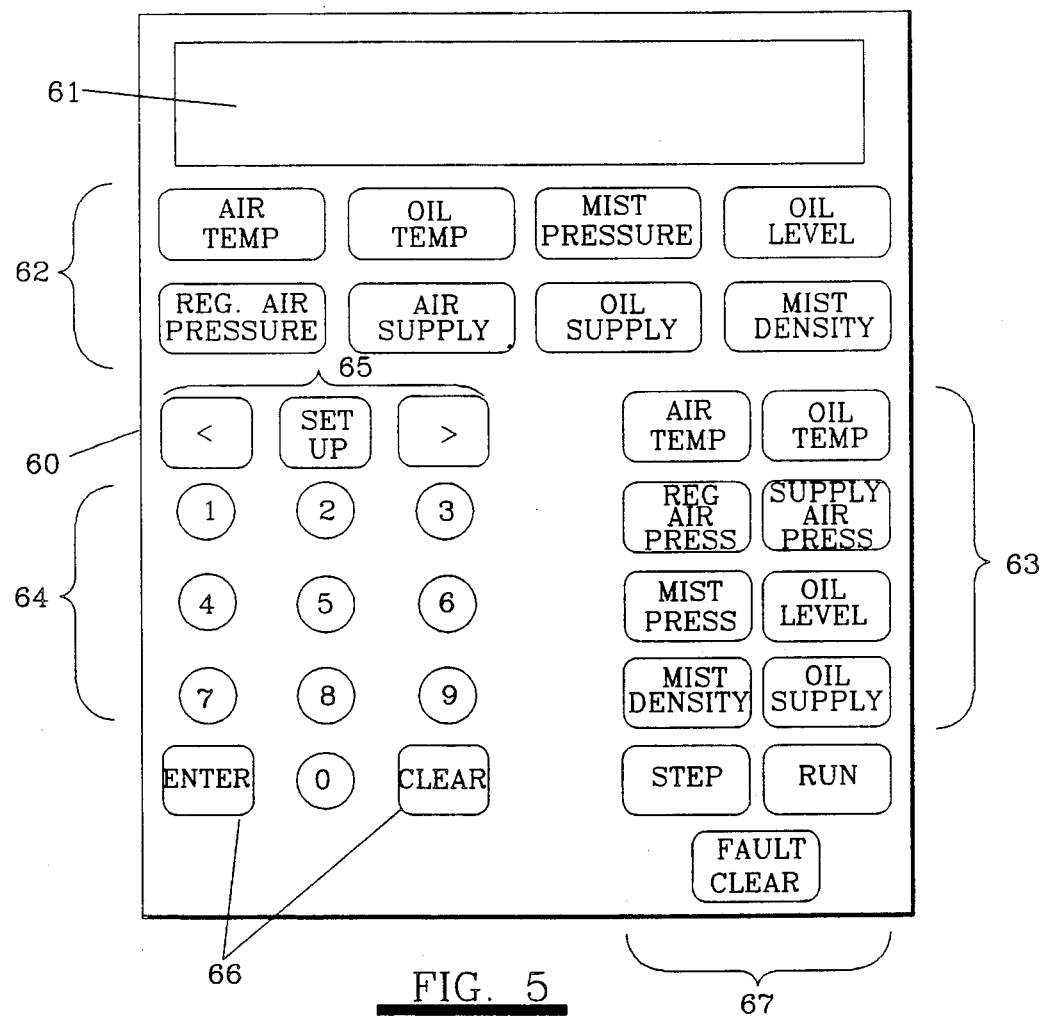
FIG. 5 is an expanded detail of computerized control components of the lubricating system of FIG. 1.

The controller 5 is equipped with a keyboard, generally designated at 60 in FIGS. 1, 5 and 6, mounted on the face of the housing 10 (see FIG. 1) in which it is housed. This keyboard 60, shown in greater detail in FIG. 5, is equipped with features that allow the user to obtain current values and set points for each of the eight operating variables, to change these set points, and to obtain first fault information that helps to diagnose system problems.

The specific features of the keyboard 60 are the following:

Alpha-numeric display window 61;
Eight individual panel alarm windows 62 for each of the eight variables being monitored;
Function keys 63 for each of the eight operating variables;
Number keys 64 used to enter numeric values into the controller;
A variety of instruction keys 65, 66, 67 used to provide specific directions to the controller.

The current condition of any of the eight variables being monitored is obtained by pressing the respective function key 63 and reading the condition on the alpha-numeric screen 61. The high and low alarm set points can be obtained by pressing the appropriate function key 63 then pressing the "Step" key 67 either twice or three times. For the three operating variables that have control set points, the control set point is displayed when the "Step" key is pressed the first time. The high alarm set point is displayed when the "Step" key is pressed the second time, and the low alarm set point is displayed when the "Step" key is pressed the third time. For the five operating variables that have no control set point, the first press of the "Step" key reveals the high alarm set point and the second press of that key reveals the low alarm set point. These messages displayed on the alpha-numeric screen 61 will automatically clear after ten seconds unless another function key is pressed.

The control and alarm set points can be changed at any time by the user provided he correctly enters the password. Each unit has a password programmed into its control logic to assure that only personnel authorized to have access to the control program are able to make changes. Once the password is entered the system enters its programming mode, and any set points can be changed by following this sequence. The variable is displayed by pressing its function key 63. The first set point is displayed by pressing the "Step" key 67. A new value can be entered by pressing the numeric keys 64 and then the enter key 66 to put the new value into memory. Any number of changes can be made in set points by following this procedure. Once all desired changes are made, the "Run" key 67 is pressed to return the controller from its programming mode to its normal operating mode. The controller will automatically switch from programming to the run mode if consecutive keys are not pressed within thirty seconds of each other. It is important to note that new set points will be accepted by the controller only if they are between the factory established high and low alarm settings. For example, if the factory setting for low oil temperature is 80 degrees F., a user setting of 70 degrees F. will not be accepted.

The control system of the present invention, as previously mentioned, is equipped with three methods for identifying alarms at the console 10 as well as the capability to receive alarms at a remote location The first consists of large red and green lights 70, 71 mounted on top of the oil mist console 10 (see FIG. 1) so they are readily visible to an operator. The green light 71 is normally on; however, it switches to red-on and green-off whenever a fault is detected. The lights return to their green-on, red-off condition when all variables return to their normal operating ranges and the "fault clear" key 67 on the keypad is pressed.

The second alarm feature consists of the eight individual panel alarm indicators 62 on the keypad. These indicators are small windows labeled with the name of each operating variable. Red and green LED's (see the fault board in FIG. 6) are located behind each window. Normally the green LED is illuminated. When a fault condition is detected the green is turned off and the red turned on. This is automatically reversed when the variable returns to its normal operating range.

The third alarm feature utilizes the alpha-numeric display screen 61 on the controller keypad. The operating variable and its current condition are automatically displayed on this screen whenever that variable is in a fault condition. When the alarm condition is corrected, the display will continue to identify the variable that was in fault until the message is cleared by pressing any key. This message retention feature is important because it lets the user know that an alarm has occurred even though the system has returned to normal operation without user intervention. If a variable is cycling back and forth between normal and alarm condition, this retention capability will let the user recognize this problem.

The alpha-numeric alarm display 61 has another important feature known as first fault indication. The user will sometimes find that the oil mist system experiences more than one fault, as displayed by two or more red lights on the individual panel alarm indicator 62. To identify the primary problem for troubleshooting, it is necessary to find out what fault occurred first and which ones are secondary. The controller provides this capability by always displaying on the alpha-numeric 61 screen the operating variable which faulted first. In addition, whenever more than one fault condition exists, the display will show the reading for the first fault variable which existed at the time that the second fault occurred. When all alarms but one are cleared the controller releases from the first fault mode and returns to showing the current condition for the one variable that is in fault.

The most important oil mist system variable to control is the mist header pressure, since this governs the flow of mist to all application points to assure that the correct amount of lubricant is being applied. If the flow of mist is contained by a restriction in the header pipe or some plugging of reclassifiers, the oil mist pressure will increase and the high set point alarm will be triggered. With all previous oil mist units, an operator might override this alarm by reducing regulated air pressure enough to clear the high mist pressure alarm. Thus the alarm could be removed but the operating problem might have still existed and machinery being lubricated could have experience bearing failures due to inadequate lubrication. The software program for the controller used in the system of the present invention eliminates this serious flaw. If anyone tries to reduce regulated air pressure in order to clear a mist pressure alarm, an alarm condition for low regulated air pressure will automatically occur. Likewise, if a low alarm condition is being signaled for mist pressure it cannot be overcome by simply raising regulated air pressure going into the mist head because that will cause a high regulated air pressure alarm to occur.

Thus, the improved lubricating system of the present invention provides a supply of pressurized air, an oil supply, and an oil mist generator for combining the air and oil in an oil mist for lubricating the bearings of rotating equipment. Sensors are provided for sensing pressures, temperatures, oil levels, densities, etc. and a computerized controller as provided for controlling and monitoring the operating conditions of the system. With a computerized control, operating variables of the system, are maintained within much more precise limits, oil consumption and oil mist density are accurately controlled and faults in the system are quickly and accurately detected. While a single embodiment of the invention has been described herein, many variations can be made without departing from the spirit of the invention. Accordingly, it is intended that the scope of the invention be limited only by the claims which follow:

We claim:

1. An improved lubricating system for continuous lubrication of a plurality of bearings of one or more pieced of equipment, said system comprising:
    air supply means an inlet of which is connected to a source of pressurized air for controlling and conditioning air for use in said system;
    oil supply means an inlet of which is connected to a source of oil for controlling and conditioning oil for use in said system;
    oil mist generation means connected to said air supply means and said oil supply means and by which air and oil therefrom are combined into an oil mist for distribution through piping and reclassifier means to said equipment bearings; and
    computerized control means connected to said air supply means, said oil supply means and said oil mist generation means for controlling and monitoring temperature, pressure and density operating conditions of said air, supply oil supply and oil mist generation means of said system.

2. An improved lubricating system as set forth in claim 1 in which each of said air supply means, said oil supply means and said oil mist generation means is provided with one or more sensors for monitoring said temperature, pressure and density operating variables thereof, said sensors being connected to a microprocessor in said computerized control means which compares at least some of said temperature, pressure and density operating variables with predetermined permissable ranges thereof and if a particular operating variable is not within its permissable range provides an alarm signal.

3. An improved lubricating system as set forth in claim 2 in which the current values of said temperature, pressure and density operating variables are translated by said microprocessor to readings visable from a central location at which said air supply means, said oil supply means, said oil mist generating means and said control means are all located.

4. An improved lubricating system as set forth in claim 3 in which said control means includes a computer compatible communication port by which said temperature, said pressure and said density operating variables readings may be transmitted to a remote location for visual observation thereof.

5. An improved lubrication system as set forth in claim 1 in which each of said air supply means, said oil supply means and said oil mist generation means is provided with one or more sensors for monitoring said temperature, pressure and density operating variables thereof, said sensors being connected to a microprocessor in said computerized control means which compares at least some of said operating variables with a preset control point to initiate or terminate events to maintain a particular operating variable at or near said preset control point.

6. An improved lubricating system as set forth in claim 1 in which each of said air supply means, said oil supply means and said oil mist generator means is provided with one or more sensors for monitoring said temperature, pressure and density operating variables thereof, said computerized control means including a microprocessor to which each of said sensors is connected, said control means also including an analog-to-digital converter by which voltage signals from said sensors are converted into binary values for comparison with maximum, minimum and control settings programmed on said microprocessor for said temperature, pressure and density operating variables.

7. An improved lubricating system as set forth in claim 6 in which said control means includes alarm means activatable by said microprocessor fi the sensors of selected ones of said temperature, pressure and density operating variables indicate that a particular operating variable does not fall between said maximum and minimum settings programmed on said microprocessor therefor.

8. An improved lubricating system as set forth in claim 7 in which said alarm means is provided with indicator means for indicating which of said operating variables does not fall between said maximum and minimum settings and, if more than one, indicating which one of said operating variables was first in not falling between said maximum and minimum settings.

9. An improved lubricating system as set forth in claim 6 in which said control means includes means for initiating or terminating events to maintain a particular one or more of said temperature pressure and density operating variables at or near a control setting programmed on said microprocessor therefor.

10. An improved lubricating system as set forth in claim 6 in which said control means includes a keyboard by which said microprocessor is programmable to change said maximum, minimum and control settings for said temperature, pressure and density operating variables.

11. An improved lubricating system as set forth in claim 10 in which said microprocessor has a password programmed thereinto requiring entry thereof through said keyboard by authorized personnel prior to said changing of said maximum, minimum and control settings.

12. An improved lubricating system as set forth in claim 1 in which said air supply means is provided with sensors for measuring air pressure and air temperature and an air heater for heating said air for use in said system, said computerized control means initiating or terminating heating by said air heater in response to signals from said air temperature sensor compared with a predetermined air temperature control setting.

13. An improved lubricating system as set forth in claim 12 in which said air heater includes an outer tubular member closed at one end, an inner tubular member concentrically disposed within said outer tubular member and a heating element disposed within said inner tubular member, air entering and flowing through an annular space between said outer and inner tubular members, then through said inner tubular member by said heating element prior to exit for use in said oil generation means.

14. An improved lubricating system as set forth in claim 1 in which said oil supply means is provided with sensors for measuring oil temperature and oil pressure and an oil heater, said computerized control means initiating or terminating heating of oil by said oil heater in response to signals from said oil temperature sensor compared with a predetermined oil temperature control setting.

15. An improved lubricating system as set forth in claim 14 in which said oil supply means includes a reservoir divided into two compartments, a first compartment into which oil first flows from said source of oil and a second compartment into which oil flows from said first compartment and from which oil flows to said oil mist generation means; said oil heater being located in said second compartment.

16. An improved lubricating system as set forth in claim 15 in which said second compartment is provided with a baffle by which warmer oil heated by said oil heater is directed upwardly and toward one side of said second compartment and cooler oil from said first compartment is directed downwardly and toward another side of said second compartment to produce efficient circulation of oil in said second compartment.

17. An improved lubricating system as set forth in claim 14 in which said oil supply means is also provided with a sensor for determining the level of oil in a reservoir of oil therein, said computerized control means initiating or terminating flow of oil to said reservoir in response to signals from said oil level sensor compared with a predetermined oil level setting.

18. An improved lubricating system as set forth in claim 1 in which said oil mist generation means is provided with an oil mist pressure sensor for sensing the pressure of oil mist distributed through said piping to said equipment bearings.

19. An improved lubricating system as set forth in claim 18 in which said control means includes oil mist pressure alarm means which is activated when said oil mist pressure is too high or too low, said control means also including air pressure alarm means which is activated when air from said air supply means is too high or too low, said control means being programmed so that if said oil mist pressure alarm is activated and correction thereof is attempted by varying the air pressure of said air supply means, said air pressure alarm means will be activated.

20. An improved lubricating system as set forth in claim 1 in which said oil mist generation means includes an oil mist density sensor for measuring the density of oil mist being distributed to said equipment bearings.

21. An improved lubricating system as set forth in claim 20 in which oil mist from said oil mist generation means is discharged into an upper space of a reservoir in which at least a portion of the oil from said oil supply means is contained, said oil mist being distributed to said equipment bearings from said upper reservoir space; said oil mist density sensor including a light source and a photocell both located in said upper reservoir space, the amount of light reaching said photocell from said light source being communicated to said control means for comparison with a constant nonvariable signal to indicate the density of oil mist in said upper reservoir space.

22. An improved lubricating system as set forth in claim 1 in which air supply means includes an air temperature sensor and an air heater and said oil supply means includes an oil temperature sensor and an oil heater, said computerized control means being connected to said temperature sensors and said heaters and responsive to signals from said air and oil temperature sensors to initiate or terminate power to said air and oil heaters for maintaining the temperature of said air and said oil within specified limits.

23. An improved lubricating system as set forth in claim 22 in which said oil supply means is provided with an oil level sensor, said computerized control means being connected to said oil level sensor and responsive to signals therefrom to initiate or terminate oil flow to maintain oil level in said oil supply means within predetermined levels.

24. An improved lubricating system as set forth in claim 1 in which said air supply means, oil supply means and oil mist generation means are provided with sensors for measuring air temperature, oil temperature, air pressure and oil mist pressure, said computerized control means being provided with alarm indicators for each of said air temperature, oil temperature, air pressure and oil mist pressure operating conditions to indicate when said operating conditions do not fall within predetermined limits.

25. An improved lubricating system as set forth in claim 24 in which said computerized control means is programmable for changing the predetermined limits of air temperature, oil temperature, air pressure and oil mist pressure operating conditions.

26. An improved lubricating system as set forth in claim 24 in which said computerized control means includes fault means to indicate when any one of said air temperature, oil temperature, air pressure and oil mist pressure operating conditions is outside of said predetermined limits.

27. An improved lubricating system as set forth in claim 26 in which said fault means includes means, when one or more than one of said air temperature, oil temperature, air pressure and oil mist pressure operating conditions is outside of said predetermined limits, to indicate which one of said operating conditions was first outside of its predetermined limit.

28. An improved lubricating system as set forth in claim 20 in which said control means controls said oil mist density by controlling the flow, pressure and temperature of air and oil from said air supply means and said oil supply means to said oil mist generating means.

29. An improved lubricating system as set forth in claim 20 in which said oil supply means is provided with an oil consumption meter readings from which, when compared with readings from said oil mist density sensor, may be used to regulate oil consumption by said system to most efficient levels.

* * * * *

REEXAMINATION CERTIFICATE (2527th)

United States Patent [19]
Gregory et al.

[11] B1 5,125,480
[45] Certificate Issued Apr. 4, 1995

[54] LUBRICATING SYSTEM

[75] Inventors: Kenneth L. Gregory, Houston; Charles W. Ehlert, Katy; G. Everett Sloat, Brookshire, all of Tex.

[73] Assignee: Lubricating Systems Company of Texas Inc., Houston, Tex.

Reexamination Request:
No. 90/003,264, Nov. 23, 1993

Reexamination Certificate for:
Patent No.: 5,125,480
Issued: Jun. 30, 1992
Appl. No.: 624,995
Filed: Dec. 10, 1990

[51] Int. Cl.⁶ .............................................. F01M 1/00
[52] U.S. Cl. ................................. 184/6.26; 184/6.1; 184/6.4; 73/10; 364/551.01; 364/556
[58] Field of Search ........................................ 184/6.26

[56] References Cited

U.S. PATENT DOCUMENTS

| | | |
|---|---|---|
| 3,939,944 | 2/1976 | Mitchell et al. |
| 3,952,566 | 4/1976 | Jacobson. |
| 4,046,455 | 12/1977 | Hopkins et al. |
| 4,184,205 | 1/1980 | Morrow ................................ 364/508 |
| 4,312,424 | 1/1982 | Taylor et al. |
| 4,445,168 | 3/1984 | Petryszyn. |
| 4,527,661 | 7/1985 | Johnstone et al. ................... 184/6.1 |
| 4,535,851 | 8/1985 | Kirkpatrick et al. .................. 75/38 |
| 4,735,826 | 4/1988 | Miki et al. ............................ 184/64 |
| 4,937,764 | 6/1990 | Komatsu et al. ..................... 364/558 |
| 5,038,890 | 8/1991 | Willner et al. ....................... 184/7.4 |
| 5,041,990 | 8/1991 | Yabumoto et al. ................... 364/510 |
| 5,058,709 | 10/1991 | Saam .................................. 184/108 |

FOREIGN PATENT DOCUMENTS 3638714 9/1990 Germany.

OTHER PUBLICATIONS

Alemite Product Literature, Oil Mist Consoles, Sep. 1984 pp. 1-55.
Alemite Product Literature, Electronic Oil Mist Monitor, 1986, pp. 1-2.

*Primary Examiner*—Thomas E. Denion

[57] ABSTRACT

An improved lubricating system for lubrication of equipment bearings comprising: an air supply subsystem, an oil supply subsystem and an oil mist generation subsystem. The oil mist generation subsystem is connected to the air supply and oil supply subsystems for combining air and oil therefrom into an oil mist for distribution to the equipment bearings. A computerized controller is connected to the air supply, oil supply and oil mist genrating subsystem for controlling and monitoring the operating conditions of the system.

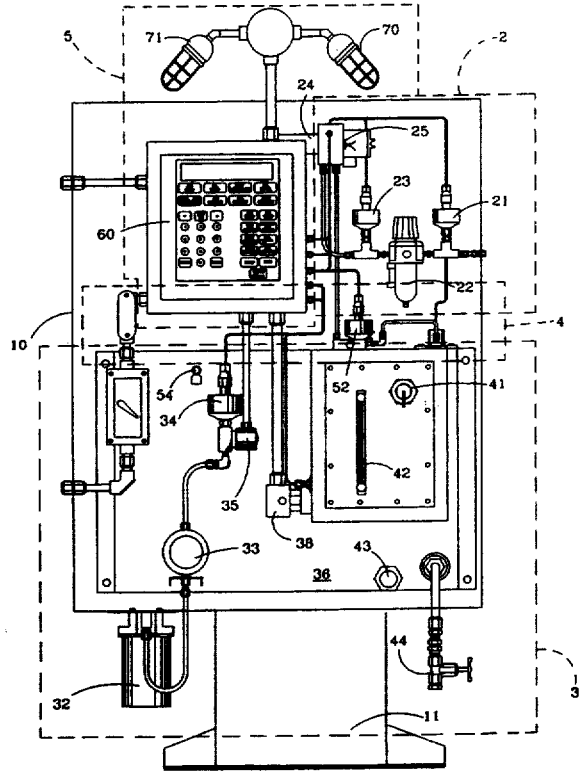

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 2 is cancelled.

Claims 1, 3, 5 and 6 are determined to be patentable as amended.

Claims 4, 7–29, dependent on an amended claim, are determined to be patentable.

1. An improved lubricating system for continuous lubrication of a plurality of bearings of one or more pieces of equipment, said system comprising:
   air supply means an inlet of which is connected to a source of pressurized air for controlling and conditioning air for use in said system;
   oil supply means an inlet of which is connected to a source of oil for controlling and conditioning oil for use in said system;
   oil mist generation means connected to said air supply means and said oil supply means and by which air and oil therefrom are combined into an oil mist for distribution through piping and reclassifier means to said equipment bearings; and
   computerized control means connected to said air supply means, said oil supply means and said oil mist generation means for controlling and monitoring temperature, pressure and density operating conditions of said air supply means, oil supply means and oil mist generation means of said systems; *said lubrication system being further characterized in that each of said air supply means, said oil supply means and said oil mist generation means is provided with one or more sensors for monitoring said temperature, pressure and density operating variables thereof, said sensors being connected to a microprocessor in said computerized control means which compares at least some of said temperature, pressure and density operating variables with predetermined permissible ranges thereof and if a particular operating variable is not within its permissible range provides an operating variable specific alarm and an automatic visual display of the current condition of the operating variable responsible therefor.*

3. An improved lubricating system as set forth in claim [2] *1* in which the current values of said temperature, pressure and density operating variables are translated by said microprocessor to readings visible from a central location at which said air supply means, said oil supply means, said oil mist generating means and said control means are located.

5. An improved lubrication system as set forth in claim 1 in which [each of said air supply means, said oil supply means and said oil mist generation means is provided with one or more sensors for monitoring said temperature, pressure and density operating variables thereof, said sensors being connected to] *said* microprocessor in said computerized control means [which] compares at least some of said operating variables with a preset control point to initiate or terminate events to maintain a particular operating variable at or near said preset control point *in a range substantially more narrow than said predetermined permissible range therefor.*

6. An improved lubricating system as set forth in claim 1 in which [each of said air supply means, said oil supply means and said oil mist generator means is provided with one or more sensors for monitoring said temperature, pressure and density operating variables thereof, said computerized control means including a microprocessor to which each of said sensors is connected] said control means also [including] *includes* an analog-to-digital converter by which voltage signals from said sensors are converted into binary values for comparison with maximum, minimum and control settings programmed on said microprocessor for said temperature, pressure and density operating variables.

* * * * *